March 31, 1959    E. E. J. COMOGLIO ET AL    2,879,843
PRESS TOOL CONSTRUCTION
Filed March 28, 1955                        2 Sheets-Sheet 1
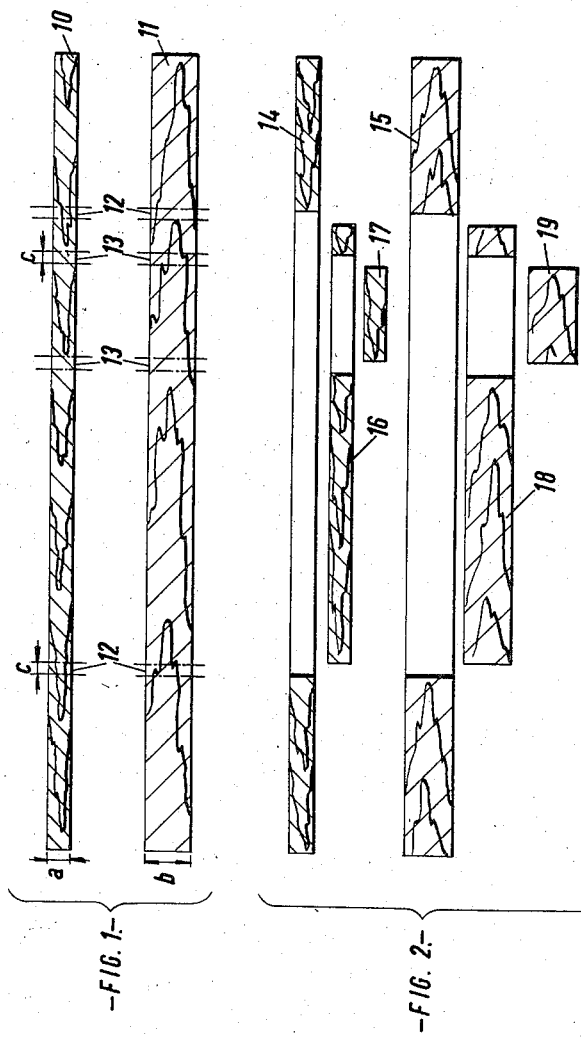
E. COMOGLIO &
D.C.M. SAMIN
             Inventors
By Mason & Hall
             Attorneys

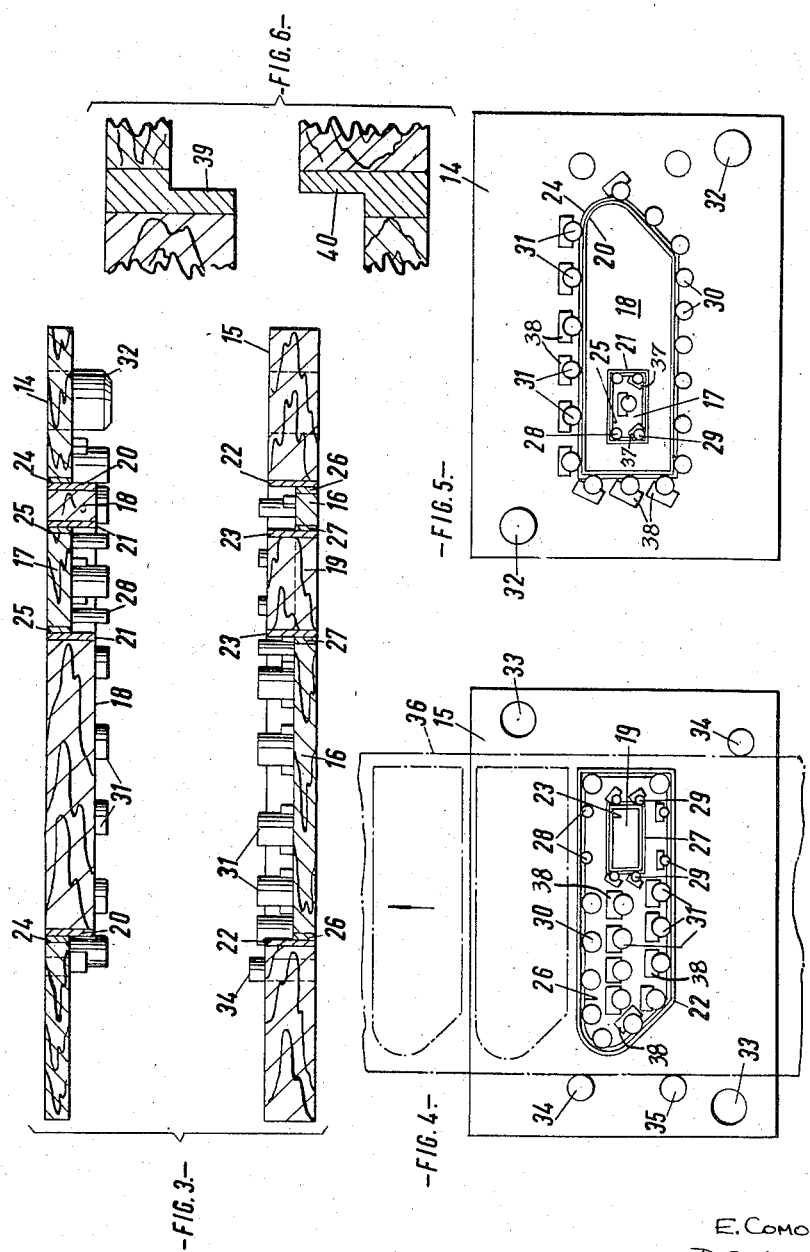

United States Patent Office 2,879,843
Patented Mar. 31, 1959

2,879,843

PRESS TOOL CONSTRUCTION

Ernest Elie Joseph Comoglio and Daniel Charles Marie Samin, Paris, France, assignors to Malew Engineering Limited, Ronaldsway, Douglas, Isle of Man, Great Britain Application March 28, 1955, Serial No. 497,276

Claims priority, application France April 30, 1954

5 Claims. (Cl. 164—29)

This invention relates to press tools that is to say, any tool or die which is adapted to form internal and/or external contours on a workpiece, such tools being known as blanking and/or piercing tools, and punching, stamping, notching, cropping, embossing and forming dies and press tools.

Press tools are known which consist of a male base part and a female base part of non-metallic material (i.e. a material which is easy to work when compared with orthodox die materials such as steel; but which has sufficiently high tensile and compressive strengths and is sufficiently elastic to support steel strip inserts; and which suffers little or no change in shape or volume due to normal variations of atmospheric temperature and humidity) such as compressed wood, veneered wood, high density laminated wood, moulded thermoplastics, with or without cloth, paper or like reinforcement, each of said base parts being slotted to receive a steel strip insert which forms a shear edge of the tool. The insert in the male part is dimensioned so as to be a clearance fit within the insert of the female part, and to give support to the inserts, the thickness of the male base part surrounded by its insert is equal to the depth of the insert, and the thickness of the female base part surrounding its insert is equal to the depth of the insert. Such press tools will hereinafter be referred to as "a press tool of the type described."

In the manufacture of these press tools it has been usual to prepare the male and female bases from two rectangles or other suitable shapes of non-metallic material of the same thickness. The outline required for the insert on the male part is then drawn onto its base and this shape is sawn through using a saw whose thickness is equal to the thickness of the insert to be used so that the base is separated into two parts, namely an inner core and a surround. The surround is next reduced in thickness by planing or routing after which it is assembled by fitting the insert into the space left in the surround and then forcing the core back into the centre of the insert.

Locating dowels are now secured to the surround of the male part and corresponding guide bushes are provided in the non-metallic material to be used for the base of the female part, so that the two parts may only be fitted together in one position relative to one another.

The face of the non-metallic material for the female base part is now treated with carbon or other suitable marking substance and an impression of the male part of the press tool is made thereon by applying pressure between the two parts. The female base part is then sawn through the outline so formed again using a saw whose thickness is equal to the thickness of the strip steel insert, a surround and a core being formed in this operation. The female press tool part is then assembled by inserting the strip steel insert into the surround and forcing the core, which in turn has been reduced in thickness, by planing or routing, so that it is equal to the thickness of the surround of the male part inside the insert. Any punches which are required on the press tool are, of course, introduced during or after these operations.

It will be evident from the foregoing that the manufacture and assembly involves many steps, and, since the thickness of parts of the bases have to be reduced, some material is wasted. This material would not be wasted, however, if the core from the female part could be used with the surround of the male part and vice versa, but in the known methods of manufacture this is not possible since the core from the male part must be slightly smaller than that from the female part so that the inserts may fit one inside the other.

One of the objects of the present invention is to overcome this difficulty so that less material is wasted in the manufacture of the press tools. A further object of the invention is to provide a method of manufacturing the press tool parts in which the number of operations required is reduced considerably, so that the cost of producing the press tool is similarly reduced and output increased.

According to the present invention there is provided a method of making a press tool, that is to say a blanking and/or piercing press tool and punching, stamping, notching, cropping die or press tool of the type comprising a male base part and a female base part of compressed wood, veneered wood or like material, each of which parts is slotted to receive strip steel inserts forming the shearing or cutting edges of the press tool of the desired contours, said slot forming the board into an inner core and an outer surround, which includes the steps of slotting or sawing the desired shape for the strip steel inserts simultaneously from two base boards which are of the desired thickness respectively for the male part surround and the female part surround.

The slotting may conveniently be effected using a saw blade of thickness equal to approximately twice the thickness of the strip steel inserts; the tool being assembled by fitting the steel strip inserts into the male surround using a packing of thickness approximately equal to the strip steel inserts between the male insert and its surround and forcing the core from the female base part into the space enclosed thereby; fitting the female strip steel insert into the female surround, fitting an appropriate packing of approximately similar thickness into the space enclosed by the female insert; and finally forcing the core from the male base part into the space enclosed by the female insert and its packing.

Preferably the base boards are located together, prior to slotting, by interengaging dowels and bushes provided on said boards.

Any punches and complementary bushes desired in the die are secured to the surrounds after assembly.

The invention will, of course, include blanking dies made by the method aforesaid.

More particularly according to the invention there is provided a press tool, that is to say a blanking and/or piercing, stamping, notching, cropping press tool or die comprising a male base part and a female base part of compressed wood, veneered wood or like material each of which parts is slotted to accommodate strip steel inserts forming the shearing or cutting edges of the press tool and defining an inner plug and an outer surround, in which the said slots are wider than the thickness of said rule steel inserts as presented at the shearing edges.

Advantageously the insert of the male part is retained in position by a packing between it and the male surround, and the female insert is retained in position by a packing between it and the female core.

In order that the invention may better be understood it will be described further by way of example with reference to one preferred form of press tool constructed according to the improved method, which is illustrated in the accompanying drawings in which:

Fig. 1 is a cross-sectional side elevation of two base boards from which the press tool is to be made, Fig. 2 is a view similar to Fig. 1 but showing the base boards cut to form complementary surrounds and inserts.

Fig. 3 is a view similar to Figs. 1 and 2 but showing the completed press tool;

Fig. 4 is a plan view on a smaller scale of the lower or female part of the press tool shown in Fig. 3, and, Fig. 5 is an underneath view on a smaller scale of the upper or male part of the press tool shown in Fig. 3.

Fig. 6 is an enlarged fragmentary view showing an alternative form wherein the insert and packing are formed integrally with one another.

Figs. 1 to 3 illustrate the steps of making the complete press tool parts of Figs. 4 and 5, the press tool being shaped so as to be capable of cutting out blanks of elongated D shape. In making the tool, two base boards 10, 11 are used, the board 10 being of the desired thickness $a$ for the surround 14 of the male part of the press tool and the board 11 being of the desired thickness $b$ for the surround 15 of the female part of the press tool.

The base boards 10, 11 are then cut at 12, 13 preferably after being located together by inter-engaging dowels and bushes (not shown) to form the surrounds 14, 15 and cores 16, 17, 18 and 19 of appropriate shape for the desired press tool by cutting slots therein of thickness $c$ equal aproximately to twice the thickness of steel inserts 20, 21, 22, 23 which provide the shearing edges of the press tool, so that the slots are wider than the thicknesses of the rule steel inserts as presented at the shearing edges. This is done by inscribing the lines of cut upon one face of one base board, clamping the two base boards 10, 11 together, and then cutting firstly the slot 13 and then the slot 12 through both base boards simultaneously.

It will therefore be evident that the preparation of the surrounds and cores can be done very quickly and easily as compared with the previously known method.

The strip steel inserts 20 to 23 which are of depth approximately equal to the depth of the base board 11 are then prepared to the desired lengths and shapes and at the same time metal packing 24, 25, 26, 27 of thickness equal to the thickness of the strip steel inserts 20 to 23, but of depth equal to the depth of the base board 10, are prepared.

The female part of the press tool illustrated in the lower half of Fig. 3 and in Fig. 4 is then assembled firstly by inserting the strip steel insert 22 into the surround 15, next inserting the metal packing 26 and then forcing the core 16 into the space surrounded by the packing 26, so that the insert 22 and the packing 26 are firmly wedged between the surround 15 and the core 16.

These operations need not be carried out in the exact order stated above. For instance it is also possible to place the core 16 within the surround 15 and subsequently insert the strip steel 22 and finally complete the die by inserting the packing 26.

The space in the core 16 from which the core 17 has been cut is next lined with the metal packing 27 and the insert 23 is then placed in position next to this packing, after which the core 19 from the baseboard 11 is forced into the space defined by the insert 23. Alternatively again this sequence of operations may vary as explained above.

The male part of the press tool which is illustrated in the top half of Fig. 3 and in Fig. 4 is assembled similarly. The packing 24 and insert 20 are inserted into the surround 14 whereupon the core 18 is forced into the space defined by the insert 20, and the insert 21, packing 25 and core 17 are then assembled in a similar manner.

In this example, rubber ejectors are provided on both the male part and female part of the tool, the purpose of which is to disengage a work piece from the tool after a blanking operation. These ejectors are each in the form of cylindrical rubber blocks 28, 29, 30, 31 which are glued to the respective surround and cores as shown. For convenience, two sizes of blocks are illustrated, but, of course, any suitable sizes and shapes can be employed so long as they stand proud of the adjacent parts of the tool. It is customary to position most of the ejectors close to the strip steel inserts in order that the ejection force may be applied as close to the edge of the cut piece and of the cut waste as possible, as shown by the blocks 28, 29, 30. A few blocks may be mounted in more central positions as shown by blocks 31.

Locating dowels 32 are provided on the surround 14 of the male part of the press tool and corresponding apertures 33 are provided in the surround 15 of the female part of the tool, and there may also be guide pegs 34 and a punch 35 which serve to align a work-piece, such as is shown in chain dotted lines at 36 in Fig. 4.

In operation, the male and female parts of the tool are mounted on the platens of a press, and as the press closes and forces the work-piece 36 against the two halves of the tool the rubber ejectors are compressed, and in compressing they increase in diameter. Where the ejectors are positioned close to the strip metal inserts, this increase in diameter is prevented at one side by the strip steel inserts and so the ejectors tend to be displaced away from the adjacent insert. Also, the work-piece 36 is progressed through the die in the direction of the arrow shown in Fig. 4, and this has a shearing effect upon the ejectors 28, 29, 30 and 31 just as the die parts are separated and prior to ejection of the blank which has been cut, tending to displace the blocks in the direction of the arrow. To overcome the tendency of the ejectors to become displaced, reinforcing pieces 37, 38 are placed where necessary. These take the form of small plates of wood, metal or the like and are shaped to lie close to the ejectors. In the depth, they may preferably be equal to half the depth of the ejectors, but they may be slightly more or slightly less. The reinforcing pieces are nailed, screwed or otherwise secured to the base boards.

Whilst in the foregoing example a press tool having an insert and a separate packing has been described, it will be obvious that the insert and its packing can be made as a single integral entity, as is shown in Fig. 6. The strip steel inserts 39, 40 are L-shaped in cross section as illustrated, the base of the L being of width equal to the width of the slot so that no separate packings are necessary. The strip steel inserts can readily be shaped appropriately in the rolling thereof.

We claim:

1. A method of making a press tool of the type comprising male and female base parts of suitable non-metallic material each of which base parts is slotted to receive strip steel inserts forming the shearing edges of the press tool, which includes the steps of sawing a slot of twice the thickness of the strip steel insert and of the desired shape simultaneously from two base boards which are of the desired thicknesses respectively for the male base part and the female base part, to form each board into a core and a surround, fitting the appropriate strip steel inserts into the male surround, with a packing of thickness equal to the thickness of the insert between the latter and the surround and forcing the core from the female base part into the space enclosed thereby; fitting the female strip steel insert into the female surround, fitting an appropriate packing of similar thickness into the space enclosed by the insert and forcing the core from the male base part into the space enclosed by the female insert and its packing, 2. A press tool comprising male and female base parts of suitable non-metallic material each of which base parts is provided with slots and accommodates in such slots strip steel inserts of L-shaped cross-section and having the base of the L at least in major part within said base parts and providing shearing edges and defining an inner plug and an outer surround, the said slots being of sufficient width to receive the bases of the L snugly and in opposite hand relation so that the projecting portions of the steel inserts are in offset relation as presented at the shearing edges, said base of said L-shaped inserts serving as a reinforcing packing means in said slots and acting to position said steel inserts of the two parts in said offset shearing relation, the insert in said male base part being retained in position by said base of said L and the female insert is likewise retained in position in said female base part by said base of said L.

3. A press tool as set forth in claim 2 in which said strip steel inserts of L-shaped cross-section each comprises a single integral entity.

4. A press tool for working sheet metal comprising a male base part and a female base core part of inert non-metallic material, each of said parts being slotted to receive strip steel inserts forming cutting edges of the press tool and defining an inner plug and an outer surround, said slots being wider than the thickness of said steel inserts as presented at the shearing edges, said insert of the male part being retained in one offset shearing position by packing means between it and the male surround, said female insert being retained in an oppositely offset shearing position by a packing between it and the female core.

5. The combination set forth in claim 4, said packing means being of substantially the same thickness as said steel inserts whereby opposite offset positioning of the packing means and the inserts in the two die parts assures correct shearing edge positions of the two opposed steel inserts.

References Cited in the file of this patent

UNITED STATES PATENTS

| | | |
|---|---|---|
| 36,993 | Clark | Nov. 25, 1862 |
| 367,326 | Laurence | July 26, 1887 |
| 1,471,653 | Fitzgerald | Oct. 23, 1923 |
| 1,701,546 | Shaw | Feb. 12, 1929 |
| 2,678,070 | Davis | May 11, 1954 |
| 2,765,034 | Wilshaw | Oct. 2, 1956 |

FOREIGN PATENTS

| | | |
|---|---|---|
| 579,523 | Great Britain | Aug. 7, 1946 |
| 583,949 | Great Britain | Jan. 3, 1947 |
| 647,814 | Great Britain | Dec. 20, 1950 |